(12) United States Patent
Semba et al.

(10) Patent No.: US 6,219,196 B1
(45) Date of Patent: Apr. 17, 2001

(54) METHOD AND APPARATUS FOR SUPPRESSING MECHANICAL RESONANCE IN A DISK DRIVE STORAGE DEVICE USING A NOTCH FILTER

(75) Inventors: Tetsuo Semba, Zama; Naoyuki Kagami; Akira Tokizono, both of Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/153,199

(22) Filed: Sep. 14, 1998

(30) Foreign Application Priority Data

Sep. 24, 1997 (JP) .................................... 9-258442

(51) Int. Cl.[7] .................................................. G11B 21/02
(52) U.S. Cl. .......................... 360/75; 360/78.09; 318/560
(58) Field of Search .................... 318/560, 629; 324/212, 226; 708/322, 323; 360/78.09, 75, 65, 77.02, 78.04

(56) References Cited

U.S. PATENT DOCUMENTS 5,404,418 * 4/1995 Nagano ................................ 388/806
5,867,342 * 2/1999 Hattori ............................... 360/77.08
5,960,091 * 9/1999 White et al. .......................... 381/98

FOREIGN PATENT DOCUMENTS 1-235082   3/1988  (JP) .
5-109217  10/1991  (JP) .
5-313751   5/1992  (JP) .

* cited by examiner

*Primary Examiner*—Alan T. Faber
(74) *Attorney, Agent, or Firm*—Noreen A. Krall; Abdy Raissinia (57) ABSTRACT

The present invention teaches the realization of a stable feedback control by selecting an optimal notch filter in an apparatus, such as a hard disk drive, that employs a positioning apparatus, such as an actuator, for positioning an object. The present invention further teaches the derivation of a frequency characteristic of a control loop excluding a notch filter by employing a method that does not damage a positioning apparatus. The present invention further teaches the method of adjusting a notch filter in accordance with a change of the resonant frequency of an actuator caused by the temperature fluctuations to prevent any deterioration of a feedback control performance.

21 Claims, 9 Drawing Sheets

PRIOR ART

Fig. 13

PRIOR ART

METHOD AND APPARATUS FOR SUPPRESSING MECHANICAL RESONANCE IN A DISK DRIVE STORAGE DEVICE USING A NOTCH FILTER

FIELD OF THE INVENTION

The present invention relates to the suppression of mechanical resonance, and more particularly to a mechanical resonance suppression method using a notch filter.

DESCRIPTION OF RELATED ART

In hard disk drive head positioning, since the mechanical resonance of an actuator has a large amplitude of peak that falls in a frequency range of several kHz, which is higher than a servo frequency bandwidth, suppression of it should be provided by a notch filter, otherwise a stable servo loop can not be obtained. The notch filter has a fixed central frequency and a digital or analog filter which has a constant Q is normally used. The resonance frequency of the actuator can be selected as the central frequency of a notch filter, but if a small Q is selected and then the suppression of the resonance is obtained in a large range of frequencies, and there is an increase of the phase delay in a servo frequency bandwidth which is lower than the central frequency of the notch filter. Since this reduces the margin for the phase of the servo loop and degrades the control performance it is preferable that a notch filter has as large Q as is possible and that the central frequency consistently corresponds to the resonant frequency. However, since the resonant frequency of each actuator differs because of manufacturing variances and also because of temperature, the Q of the notch filter is set to a small value and the design of an actuator includes a margin that enables it to suppress the resonance even when the resonant frequency is slightly shifted. When designing an actuator, therefore, consideration must be given to reducing the incidence of manufacturing variances and the effect of temperature changes, and further, to ensuring that the amplitude of the resonance is small and the frequency is high. Consideration must also be given to the fact that when the number of disks in a hard disk drive is increased, the mass of the actuator is likewise increased, and accordingly, the resonant frequency is lowered; and also to the fact that when the number of revolutions of the disks is increased, the servo bandwidth is raised. These are problems that adversely affect the operation of a notch filter.

Techniques have been developed whereby the matching of the central frequency of a notch filter with the resonant frequency of an actuator is performed during the manufacturing process. Two methods are available: one employs a head position error signal output immediately after the seeking operation is completed; the other employs a transfer function of a open loop of the head positioning.

Figure 12:
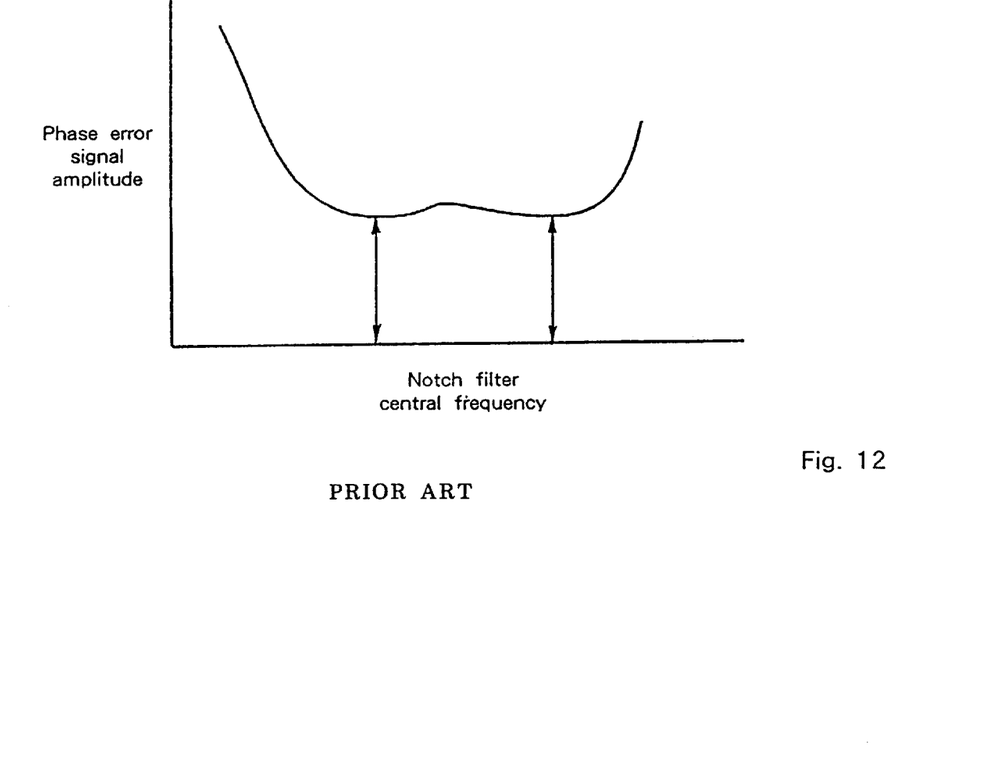
FIG. 12 is a graph for explaining a conventional problem.

The first method involving the employment of a head position error signal output immediately after the seeking process is completed is disclosed in Japanese Unexamined Patent Publication No. Hei 1-235082. This invention relates to a method for adjusting a notch filter in an optical disk drive, and for obtaining a resonant frequency and a resonance value of a mechanism by sweeping the gain of a servo and the central frequency of a notch filter to calculate a point at which a head position error signal has a minimum value. Many problems arise when this method is actually employed. Specifically, the mechanism does not always have a single resonance, and the presence of multiple resonances adversely affects a position error signal. As a result, a plurality of locations at which the position error signal reaches a local minimum appear, as shown in FIG. 12. The locations the position error signal actually reaches the minimum varies in accordance with the temperature of the device and the friction produced by the movable section of the mechanism. In addition, in many cases, an apparently minimum value obtained using the secondary function shown in FIG. 2 of the above publication is not provided, the area in which the minimum value occurs is flattened, and an error of the minimum value causes a large frequency error. In other words, it is very difficult to detect a reliable resonant frequency. Further, since the gain of a control loop is changed in order to measure the resonant frequency, the control system tends to be unstable, and mechanical components, such as an actuator, may be damaged.

Figure 13:
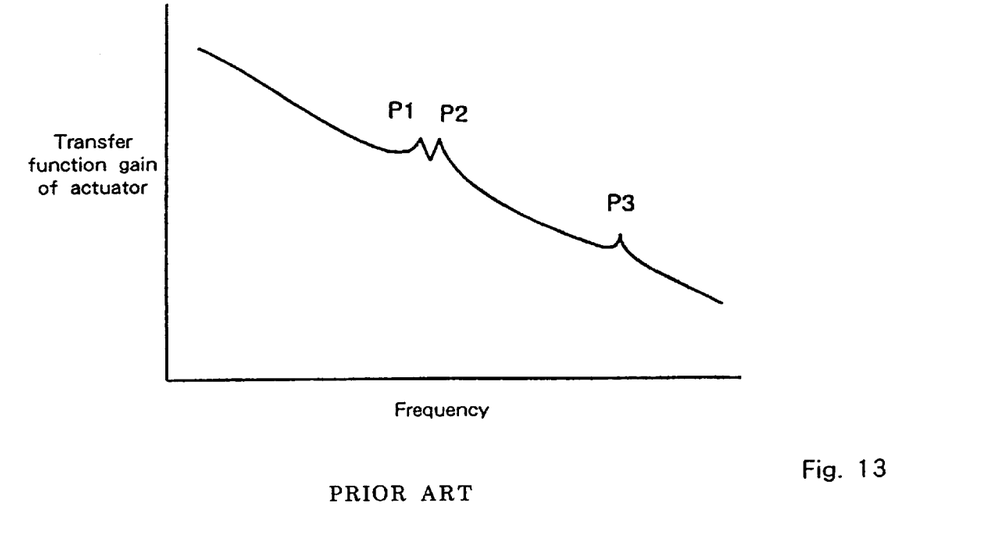
FIG. 13 is a graph for explaining another conventional problem.

Several methods for employing the transfer function of an open loop of the head positioning have been developed. The invention described in Japanese Unexamined Patent Publication No. Hei 5-109217 relates to a method for adjusting a notch filter in a magnetic disk drive. A signal having a specific frequency is input into a VCM, the transfer function of the actuator is measured by sweeping that frequency, and the central frequency of the notch filter is set at the peak of the transfer function. However, many problems will arise when this method is actually employed. Specifically, a mechanical system does not always have a single resonance, and there may be a plurality of resonances occurring at very close frequencies, such as those shown as P1 and P2 in FIG. 13. When the notch filter is adjusted to one of the peaks in accordance with the transfer function, the suppression of the other peak is not possible. In paragraph [0017] in this publication, the statement that "only one frequency point is assumed to reduce the gain. If the filter constant must be adjusted at a plurality of frequency points, the measured frequency range need only be changed and the same process repeated" means that another filter can control P3 in FIG. 13, and it implies that when there are a plurality of peaks, such as P1 and P2, in the same measurement range, they can not be controlled by a single notch filter.

The method for employing the transfer function of the actuator is also disclosed in Japanese Unexamined Patent Publication No. Hei 5-313751. This invention is very similar to that in Japanese Unexamined Patent Publication No. Hei 5-109217. As cited in the claims, "a maximum waveform value, at which the obtained gain change characteristic is shifted from a predetermined characteristic, a frequency of the maximum waveform value and the width of the waveform are detected, and a frequency characteristic that cancels the shifted waveform is calculated to reset the constant of the notch filter," the peak of the transfer function is detected and is employed as the central frequency of the notch filter, and the width of the resonance peak is employed as its Q. The existence of a plurality of peaks can be handled as described in paragraph [0029] in this publication, where it says that "while there are many cases, such one where more than one peak exists, generally F1 and F2 of the notch filter are calculated and a damping depth G is determined to enclose gain peaks that fall within the range extending from F1 to F2." However, since the precise detection of F1 and F2 is difficult because the actual frequency characteristic does not have a smooth shape, as shown in FIG. 3(B) of this publication, the accuracy of the obtained Q of the notch filter is low. Further, since the central frequency of the notch filter is set to the maximum peak frequency and the other peaks are handled by increasing the width of the notch filter, the Q of the notch filter is so set that it is lower than necessary, with the result that the phase margin of the servo loop is reduced and the control characteristic is deteriorated.

Although the above publications teach the adjustment of the notch filter not only during the manufacturing process but also during normal operation, this is not a desireable approach. If the same adjustment method as used in the manufacturing process is also employed during the normal operation of the apparatus, much time is required for the adjustment and this may serve to interrupt the normal operation function.

SUMMARY OF THE INVENTION

It is one object of the present invention to realize a stable feedback control by selecting an optimal notch filter, even when in an apparatus (e.g., a hard disk drive), which employs a positioning apparatus such as an actuator for positioning a control object, and mechanical resonances occur at a plurality of frequencies.

It is another object of the present invention to derive a frequency characteristic of a control loop excluding a notch filter by employing a method that does not damage a positioning apparatus.

It is an additional object of the present invention to adjust a notch filter in accordance with a change of the resonant frequency of an actuator due to a temperature dependency, and to constitute a control loop with which there is no deterioration of a control performance.

It is a further object of the present invention to provide a method requiring only a short time for the adjustment of a notch filter, which is performed during the normal operation of the positioning apparatus, so that the normal operation of the apparatus is seldom interrupted.

To derive a frequency characteristic of a control loop, according to the present invention the following processing is performed. The steps performed are: (A) deriving the frequency characteristic of a control loop of a controller including a first notch filter between a maximum frequency $f_{max}$ of the frequency characteristic to be derived and a frequency $f_3$ ($f_{max}>f_3$), wherein the first notch filter has a central frequency of $f_1$ that falls between a minimum frequency $f_{min}$ of the frequency characteristic to be derived and a frequency $f_3$ ($f_{min}<f_3$); (B) by using the frequency characteristic of the first notch filter, calculating a first portion of the frequency characteristic of the control loop excluding the first notch filter from the frequency characteristic of the control loop including the first notch filter; (C) deriving the frequency characteristic of a control loop including a second notch filter between the minimum frequency $f_{min}$ and the frequency $f_3$, wherein the second notch filter has a central frequency of $f_2$ that falls between the maximum frequency $f_{max}$ and the frequency $f_3$; (D) by using the frequency characteristic of the second notch filter, calculating a second portion of the frequency characteristic of the control loop excluding the second notch filter from the frequency characteristic of the control loop including the second notch filter; and (E) combining the first and second portions of the frequency characteristic of the control loop. The performance order of the steps are performed may be (C) (D) (A) (B); (A) (C) (B) (D); (A) (C) (D) (B); (C) (A) (B) (D); or (C) (A) (D) (B). While there are various methods for performing steps (A) and (C), generally a method is employed for measuring, for a signal of each frequency, a signal concerning a position error of an object to be controlled in a control loop, and employing the measured value for calculation. By deriving the frequency characteristic of the object to be controlled using this method, the loop gain is not changed and the notch filter is always incorporated, so that the control loop seldom becomes unstable.

The above processing, except for the measurement of an original signal (a signal in a control loop, e.g., a head position error signal) used for the deriving processes at (A) and (C), is mainly performed by an apparatus for adjusting a positioning apparatus, such as a hard disk drive that includes a control loop, but it can be performed by the positioning apparatus. It is also possible for the positioning apparatus to perform one part of the above processing and for the adjustment apparatus to perform the remaining part.

To set up a notch filter provided in a control loop, for the present invention the following processing is performed. The steps performed are: deriving the frequency characteristic of the control loop excluding the notch filter; calculating the frequency characteristic of the control loop including a first notch filter from the frequency characteristic of the first notch filter and the frequency characteristic of the control loop excluding the notch filter, wherein the first notch filter has a specific frequency as a central frequency, and detecting a minimum distance between a predetermined reference frequency characteristic and the frequency characteristic of the control loop including the first notch filter; performing said calculating step while changing the central frequency of the notch filter in a required frequency bandwidth; and finding out a maximum value from among detected minimum distances, and setting, to the notch filter, the central frequency of the first notch filter which causes the maximum value. The previously mentioned process may be performed at the step of deriving the frequency characteristic of the control loop excluding the notch filter. To perform the calculating step, the parameters of the notch filter must be set while taking into account not only the central frequency but also the phase delay in the servo frequency bandwidth. That is, the parameters of the notch filter are so set that a constant phase delay and a predetermined central frequency can be provided. So long as the phase delays at frequencies in the servo bandwidth are constant, a mechanical resonant peak can be suppressed without deterioration of the control performance, even when the resonant frequency of the actuator is shifted. If the parameters of the notch filter are calculated in advance and are read out each time the calculating step is performed, the processing speed is increased.

The predetermined reference frequency characteristic is an ideal frequency characteristic, and various forms can be employed to define the distance between the reference frequency characteristic and the frequency characteristic of the control loop including the notch filter. This process is performed by the apparatus for adjusting the positioning apparatus, but one part or all of the process can be performed by the positioning apparatus.

In addition, for a notch filter, the central frequency of which is set, it is possible to further perform a step of calculating a frequency at which a distance between the predetermined reference frequency characteristic and the frequency characteristic of the control loop including the notch filter is the minimum. This process is performed because of the collection of data that are collected that are used in a process that may be performed by the positioning apparatus to adjust the central frequency during the normal operation. In the preferred embodiment of the present invention, there are employed a frequency that is higher than the central frequency and has a minimum distance, and a frequency that is lower than the central frequency and has a minimum distance.

For a positioning apparatus performing the adjustment of a notch filter during the normal operation, steps performed are: deriving, at a first frequency, a first distance between a current frequency characteristic of a control loop and a predetermined reference frequency characteristic, wherein the first frequency is higher than a central frequency of the notch filter, and a distance between the frequency characteristic of the control loop and the predetermined reference frequency characteristic was the minimum at the first frequency; deriving, at a second frequency, a second distance between the current frequency characteristic of the control loop and the predetermined reference frequency characteristic, wherein the second frequency is lower than the central frequency of the notch filter, and a distance between the frequency characteristic of the control loop and the predetermined reference frequency characteristic was the minimum at the second frequency; and by using the first and second distances, determining whether the central frequency of the notch filter should be shifted. As described above, whether the central frequency of the notch filter should be shifted can be determined by measuring only the current characteristic of the control loop at the first and second frequencies. As a result, the search of the optimal notch filter, which is performed during the normal operation of the positioning apparatus, can be completed within a short time, and this rarely results in an interruption of the normal operation.

The determining step may include steps of: calculating a difference between the first and second distances; and determining whether the difference exceeds a predetermined threshold value. Further following steps may be included: determining which of the first distance and the second distance is greater if the central frequency of the notch filter is shifted; if the first distance is greater, adjusting the notch filter by lowering the central frequency; if the second distance is greater, adjusting the notch filter by raising the central frequency.

If the function of the positioning apparatus is to be minimized, the apparatus for adjusting the positioning apparatus comprises: a module, which functions as an interface with the positioning apparatus, for receiving, from the controller, a first signal (for example, a signal concerning a position error of an object to be controlled) in the control loop including a first notch filter at a frequency between a maximum frequency $f_{max}$ of a frequency characteristic to be derived and a frequency $f_3$ ($f_{max}>f_3$), wherein the first notch filter has a central frequency $f_1$ between a minimum frequency $f_{min}$ of the frequency characteristic to be derived and the frequency $f_3$ ($f_{min}-f_3$), and for receiving, from the controller, a second signal (for example, a signal concerning a position error of an object to be controlled) in the control loop including a second notch filter at a frequency between the frequency $f_{min}$, and the frequency $f_3$, wherein the second notch filter has a central frequency $f_2$ between the maximum frequency $f_{max}$ and the frequency $f_3$; a module for employing the first signal to calculate the frequency characteristic of the control loop including the first notch filter, and for employing the second signal to calculate the frequency characteristic of the control loop including the second notch filter; and a module for employing the frequency characteristic of the first notch filter to calculate a first portion of the frequency characteristic of the control loop excluding the first notch filter from the frequency characteristic of the control loop including the first notch filter, and for employing the frequency characteristic of the second notch filter to calculate a second portion of the frequency characteristic of the control loop excluding the second notch filter from the frequency characteristic of the control loop including the second notch filter, and for combining the first and second portions of the frequency characteristic.

With reference still to such an apparatus for adjusting a positioning apparatus, the positioning apparatus comprises: a notch filter that has a central frequency $f_1$ between a minimum frequency $f_{min}$ of a frequency characteristic to be derived and a frequency $f_3$ ($f_{min}<f_3$); and a first module for inputting, into a control loop including the notch filter, a first signal having a frequency between a maximum frequency $f_{max}$ of the frequency characteristic to be derived and the frequency $f_3$ ($f_{max}>f_3$), and for storing a value of a second signal corresponding to the first signal (e.g., a signal concerning a position error of an object to be controlled) in the control loop, wherein, if a frequency $f_2$ between the maximum frequency $f_{max}$ and the frequency $f_3$ is set as the central frequency of the notch filter, the module inputs, into the control loop including the notch filter in which the frequency $f_2$ is set as a central frequency, a third signal having a frequency between the minimum frequency $f_{min}$ and the frequency $f_3$, and stores a value of a fourth signal corresponding to the third signal (e.g., a signal concerning a position error of an object to be controlled) in the control loop. The positioning apparatus can also have other functions.

Unlike the prior art inventions, according to the present invention the frequency at the peak of the transfer function is not directly measured, but the form of the transfer function is employed to select an optimal notch filter so that an unnecessary peak of an open loop gain is lowered. Therefore, a method can be implemented that is rarely affected by the form of mechanical resonance, such as overlapping peaks of a plurality of mechanical resonance or the rough shape of a peak form. In the following explanation, a hard disk drive is employed as a typical example, but the present invention can also be applied for a robot and a scanning microscope, and an optical disk drive, which use an actuator or a motor because the mechanical resonance is present in a control loop and affects the operation of the apparatus.

The steps of the above processing may be performed by a computer program (including micro code), or by an electrical circuit.

DETAILED DESCRIPTION OF THE PREFERRED EMBODIMENT

Figure 1:
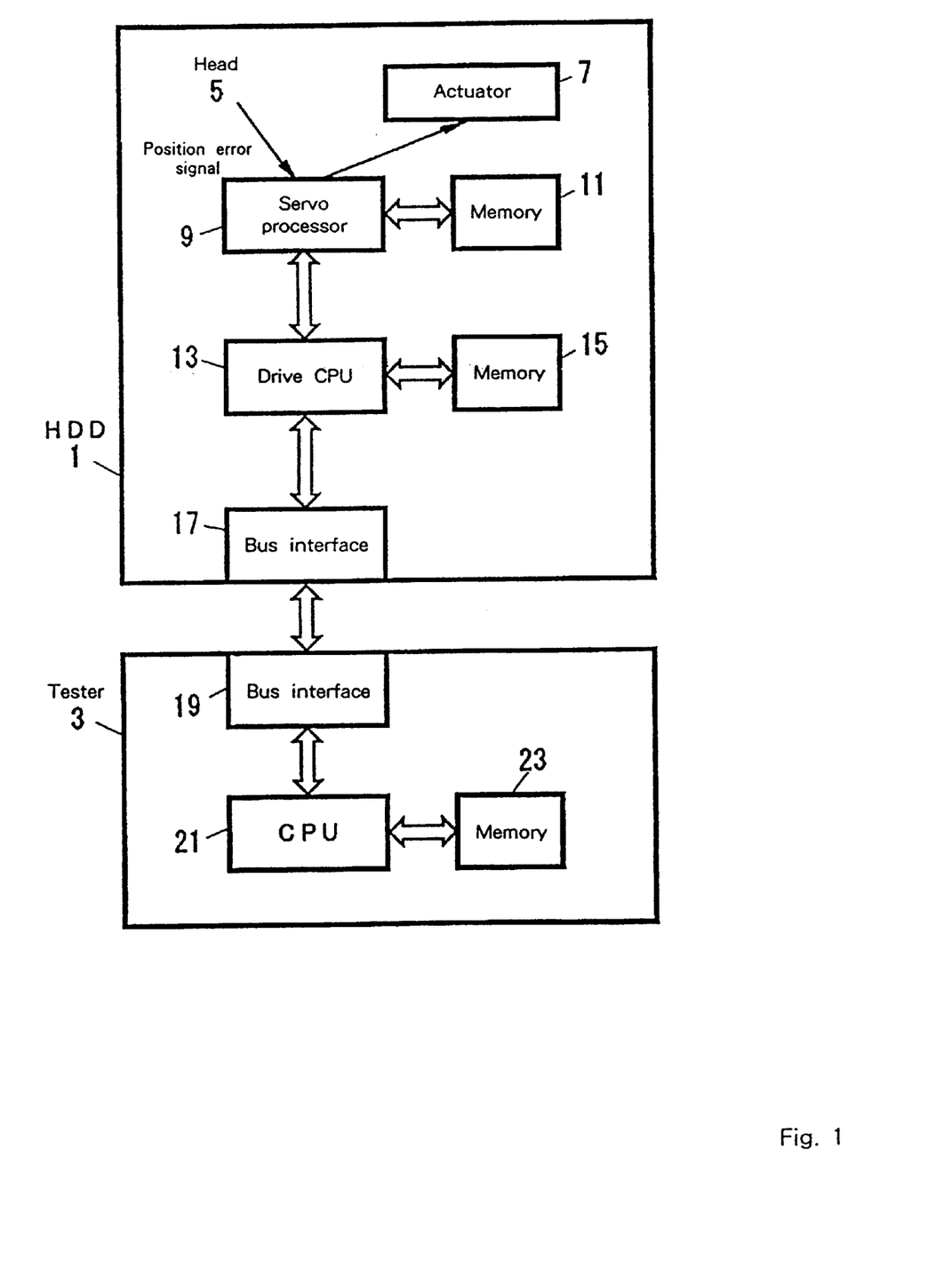
FIG. 1 is a functional block diagram of the present invention.
Figure 2:
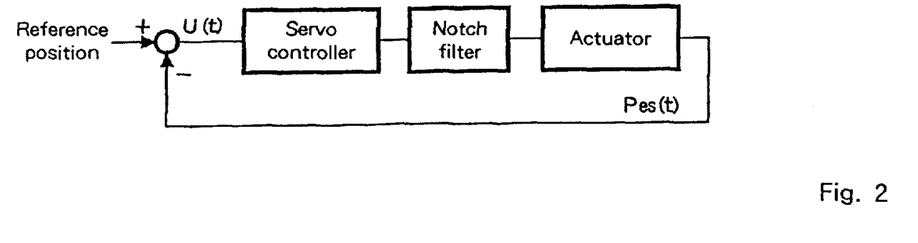
FIG. 2 is a diagram showing an example control loop.

FIG. 1 shows a block diagram of a hard disk drive (HDD) 1 with a positioning apparatus (actuator 7), and a function tester 3, its adjustment apparatus arranged according to the present invention. The HDD 1 has a bus interface 17 to connect it with the computer main body and the tester 3. An IDE or SCSI interface is used as the bus interface 17, but another interface may be employed. The bus interface 17 is connected to a drive CPU 13, which functions for the entire HDD 1. The drive CPU 13 is connected to a memory 15 and a servo processor 9. The servo processor 9 is connected to a memory 11, and transmits a signal to the actuator 7, or receives a position error signal from a head 5. The servo processor 9 includes a servo controller and a notch filter. Specifically, as shown in FIG. 2, a control loop includes the servo controller, the notch filter and the actuator connected in series. The control loop feeds back a position error signal $P_{es}(t)$ as the output of the actuator. The input from a reference position and a position error signal $-P_{es}(t)$ are added together to constitute U(t), which will be employed later.

With continued reference to FIG. 1, the tester 3 includes a bus interface 19, corresponding to the interface 17 of the HDD 1. The bus interface 19 is connected to a CPU 21, which in turn is connected to a memory 23.

Figure 3:
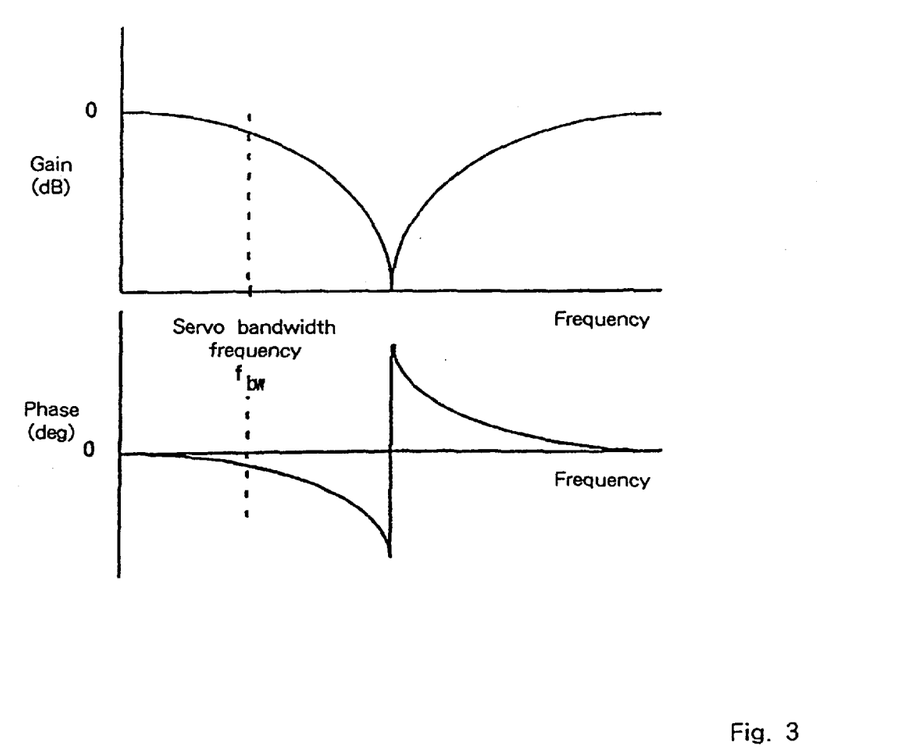
FIG. 3 is a graph showing the frequency characteristic of a notch filter.
Figure 4:
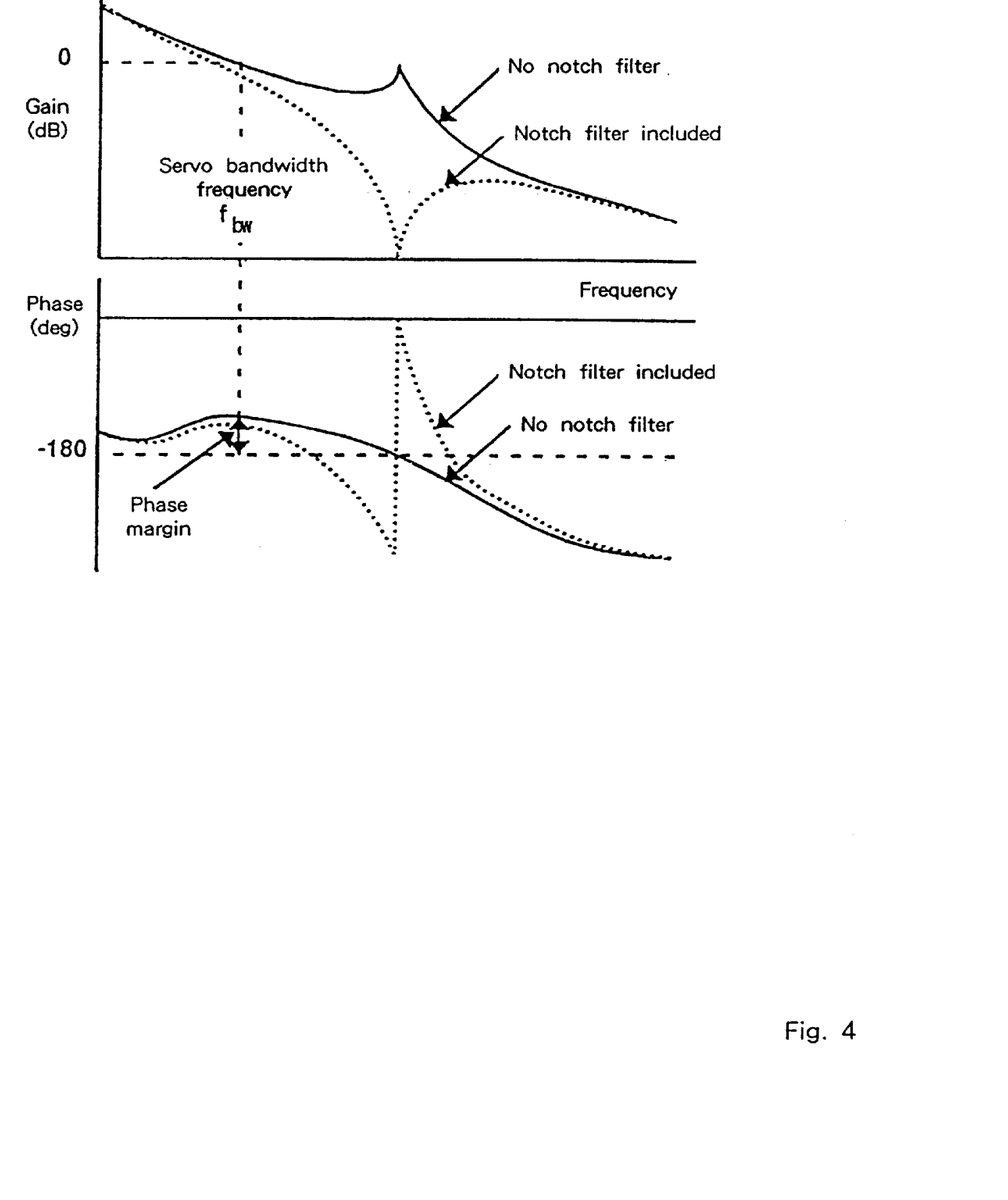
FIG. 4 is a graph showing the frequency characteristic of a control loop including a notch filter.

Generally, the apparatus that employs the actuator for positioning has a notch filter shown in FIG. 2 into the control loop and prevents the degradation of the control performance due to the mechanical resonance produced by the actuator. If there are the mechanical resonance peaks, not only the gain margin of the control loop is reduced, but also a minute vibration element remains in the position error signal and degrades the control performance. Since the notch filter suppresses the peak of the resonance, the gain margin is increased. However, as shown in FIG. 3, the phase at the frequency in the control bandwidth is delayed because of the phase characteristic of the notch filter, and the phase margin is reduced (see FIG. 4). It is apparent from FIG. 4 that the phase characteristic in which the notch filter is provided and that is indicated by the broken line is lower at frequency $f_{bw}$ than is the phase characteristic in which the notch filter is not provided and that is indicated by the solid line.

Figure 5:
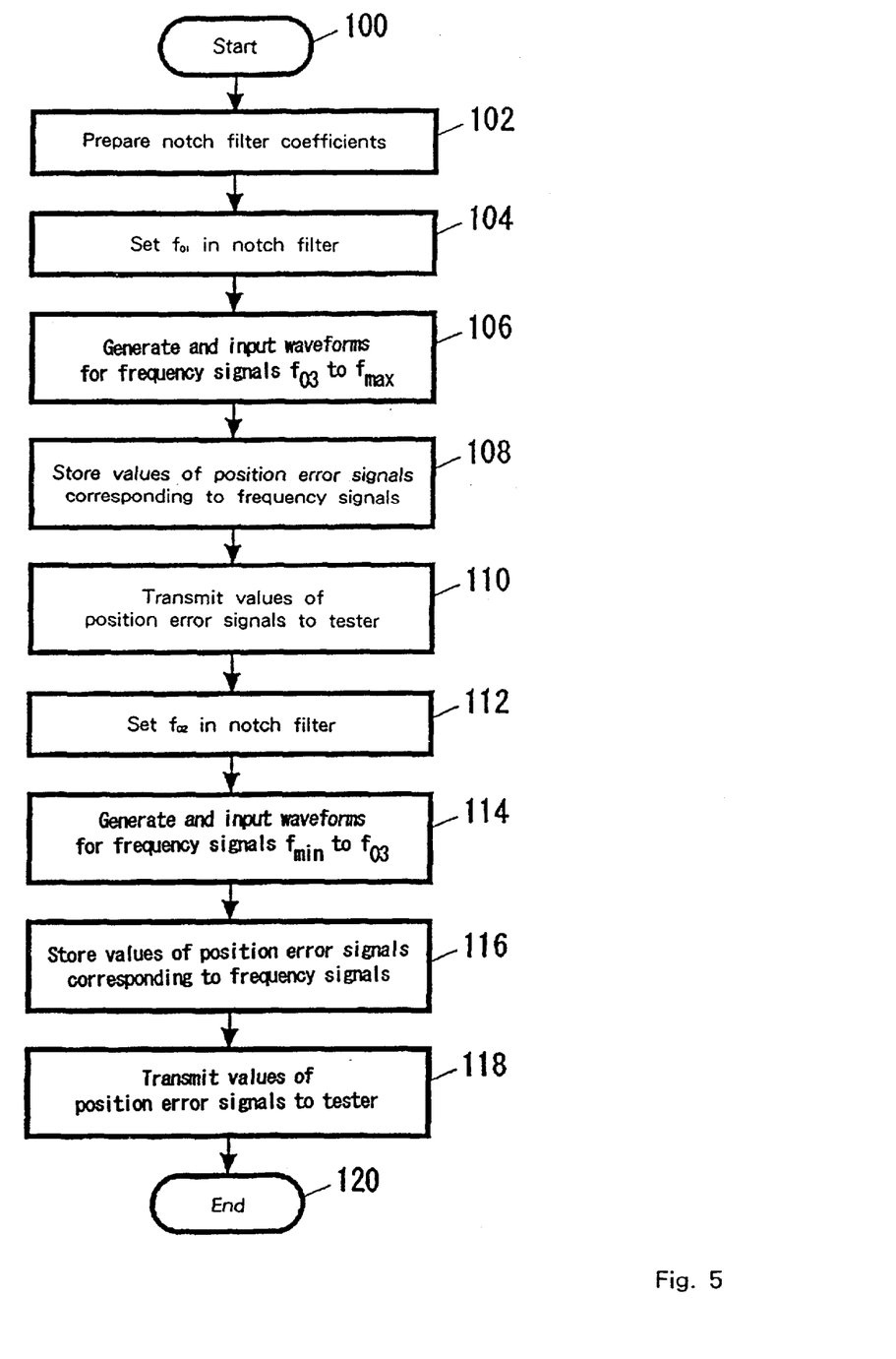
FIG. 5 is a flowchart of the processing that is mainly performed by the positioning apparatus.
Figure 6:
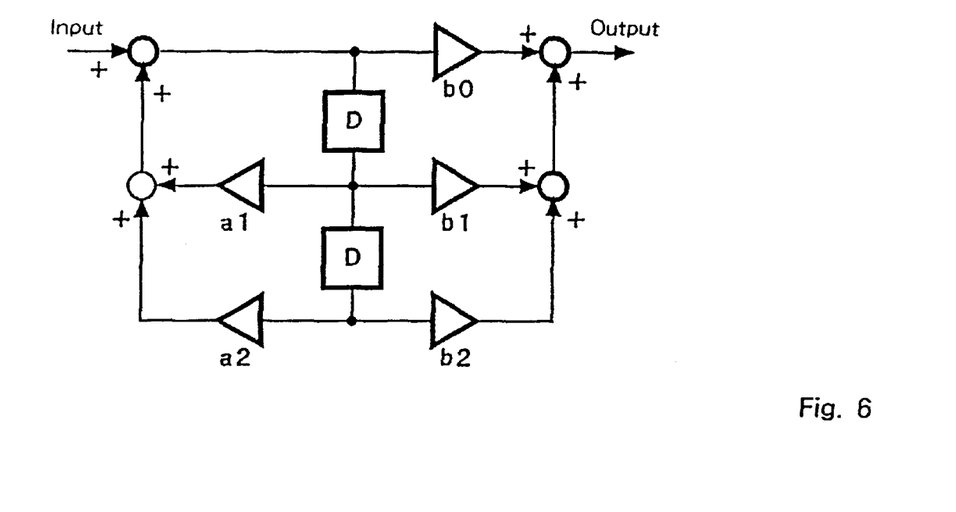
FIG. 6 is a circuit diagram showing the notch filter.

Therefore, a notch filter whose phase delay at the frequency $f_{bw}$ (e.g., 500 Hz) in the control bandwidth is constant (e.g., 5 degrees) is calculated in advance. For example, coefficients for the notch filter the central frequency $\Delta f$ of which differs for each frequency (e.g., 30 Hz) in the vicinity (e.g., ñ 500 Hz) of the frequency at which the mechanical resonance to be suppressed is located, is calculated and the coefficients are stored in a table in the memory 23 of the tester 3 (step 102 in FIG. 5), or it may be stored in the memory 11 of the HDD 1. FIG. 6 shows an example notch filter, and five coefficients, $a_1$, $a_2$, $b_0$, $b_1$, and $b_2$, that are required for one filter.

The CPU 21 of the tester 3 selects two notch filters having the central frequencies $f_{01}$ and $f_{02}$ from the notch filter table in the memory 23, and transmits and sets the coefficients for the notch filter having the frequency $f_{01}$ to the notch filter via the bus interfaces 19 and 17 and the drive CPU 13 (step 104). Here it should be noted that $f_{01} < f_{02}$. When the coefficients for the notch filter are stored in the memory 11 in advance, only the frequency $f_{01}$ need be set. The drive CPU 13 develops the waveform $R_{ef}(t)=a_r\sin(2\pi ft)$ in the memory 15 for each frequency at a predetermined interval between $f_{max}$ to $f_{03}$ ($f_{min}<f_{03}<f_{max}$ and $f_{min}<f_{01}<f_{03}$), and reads the developed waveform for each clock and inputs it in the servo processor 9 (step 106). The input signal is added to a reference position in FIG. 2.

For each frequency from $f_{max}$ to $f_{03}$, the value of the position error signal $P_{es}(t)$, which is detected at the same time the signal is input and is transmitted to the servo processor 9, is stored in the memory 11 or 15 (step 108). If a minimum configuration of the HDD 1 is desired, the stored position error signal $P_{es}(t)$ is transmitted to the tester 3 (step 110). However, if the following processing is performed in the HDD 1, that signal need not be transmitted to the tester 3.

The CPU 21 of the tester 3 sets the coefficients for the notch filter having the frequency $f_{02}$ in the notch filter via the bus interfaces 19 and 17 and the drive CPU 13 (step 112). As described above, when the coefficients for the notch filter are stored in the memory 11 in advance, only the frequency $f_{02}$ need be designated. Then, the drive CPU 13 develops the waveform of $R_{ef}(t)=a_r\sin(2\pi ft)$ in the memory 15 for each frequency at a predetermined interval between $f_{min}$ and $f_{03}$ ($f_{03}<f_{02}<f_{max}$), and reads out the developed waveform for each clock and inputs it in the servo processor 9 (step 114).

For each frequency from $f_{min}$ to $f_{03}$, the value of the position error signal $P_{es}(t)$, which is detected at the same time as the signal input and is input to the servo processor 9, is stored in the memory 11 or 15 (step 116). If a minimum configuration of the HDD 1 is desired, the stored position error signal $P_{es}(t)$ is transmitted to the tester 3 (step 118). However, if the following processing is performed in the HDD 1, that signal need not be transmitted to the tester 3.

Figure 7:
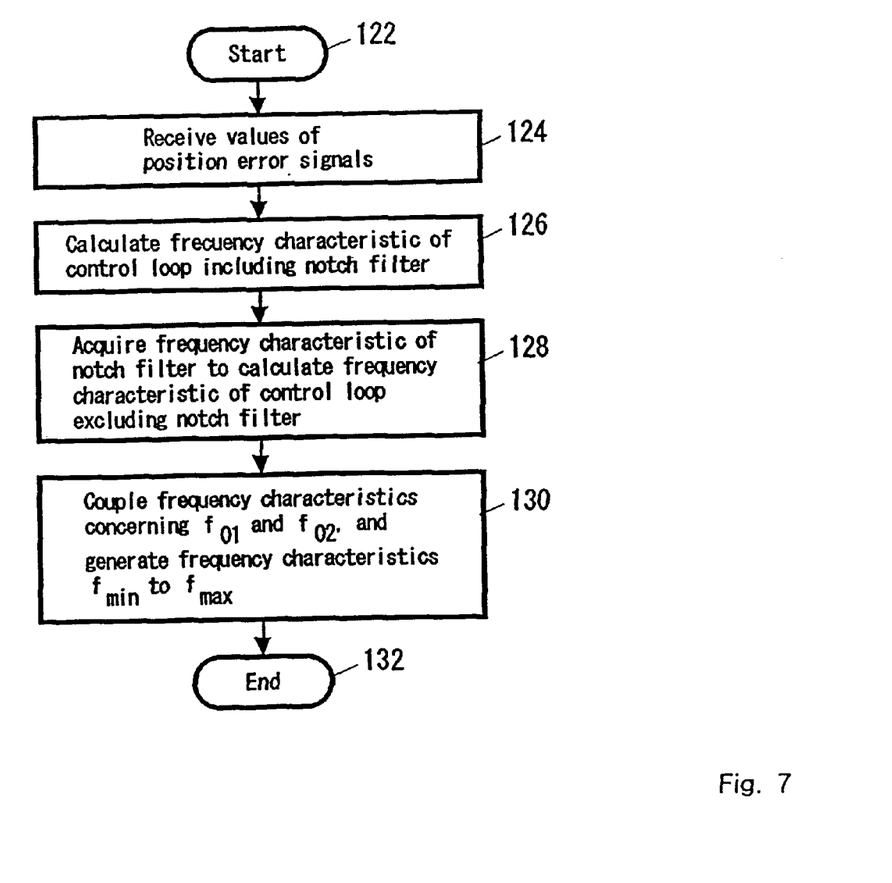
FIG. 7 is a flowchart showing the processing performed by an apparatus mainly for adjusting the positioning apparatus.

When the value of the position error signal $P_{es}(t)$ is transmitted to the tester 3, the tester receives it (step 124 in FIG. 7). When such a value is not transmitted, this step is not required. The CPU 21 of the tester 3 employs the following equation to calculate an open loop transfer function of the control loop including the notch filter that has the central frequency of $f_{01}$.

$$T_{open1}(f) = \left[1 + \frac{a_r}{\sqrt{\left(\sum P_{es}(t)\sin(2\pi ft)\right)^2 + \left(\sum P_{es}(t)\cos(2\pi ft)\right)^2}}\right]^{-1} \quad \text{Equation 1}$$

By calculating the equation 1 for individual frequencies $f_{max}$ to $f_{03}$, the frequency characteristic of the control loop including the notch filter between the frequencies $f_{max}$ and $f_{03}$ can be acquired.

Similarly, the CPU 21 employs the equation 1 to calculate an open loop transfer function for the control loop including the notch filter that has the central frequency of $f_{02}$. By calculating the equation 1 for individual frequencies $f_{min}$ to $f_{03}$ (the result is $T_{open2}(t)$), the frequency characteristic of the control loop including the notch filter between the frequencies $f_{min}$ and $f_{03}$ can be acquired (step 126).

There is another method for calculating $T_{open1}(t)$. For example, the previously described U(t) is employed to perform the following calculation.

$$T_{open1}(f) = \sqrt{\frac{\left(\sum P_{es}(t)\sin(2\pi ft)\right)^2 + \left(\sum P_{es}(t)\cos(2\pi ft)\right)^2}{\left(\sum U(t)\sin(2\pi ft)\right)^2 + \left(\sum U(t)\cos(2\pi ft)\right)^2}} \quad \text{Equation 2}$$

There is an additional method wherein the position of the signal input is changed to a position for inputting an actuator drive signal.

The process at step 126 may be performed by the drive CPU 13 or the servo processor 9 to transmit $T_{open1}(t)$ and $T_{open2}(t)$ to the tester 3.

Following this, the frequency characteristic of the notch filter having the central frequency $f_{01}$ is calculated. The frequency characteristic is acquired from the coefficients for the notch filter when the frequency $f_{01}$ stored in the memory 23 is used as its central frequency. The frequency characteristic of the notch filter having the central frequency of $f_{02}$ is acquired in the same manner. The calculation is as follows.

$$G_{notch1}(f) = \frac{b_0 e^{j4\pi fT_s} + b_1 e^{j2\pi fT_s} + b_2}{e^{j4\pi fT_s} + a_1 e^{j2\pi fT_s} + a_2} \quad \text{Equation 3}$$

It should be noted that $T_s$ denotes a sampling period, and the frequency characteristic of the notch filter having the central frequency $f_{02}$ is $G_{notch2}(f)$.

Then, $T_1(f)=T_{open1}(f)/G_{notch1}(f)$ is calculated to obtain a first portion of the frequency characteristic of the control loop excluding the notch filter. In the same manner, $T_2(f)=T_{open2}(f)/G_{notch2}(f)$ is calculated to obtain a second portion of the frequency characteristic of the control loop excluding the notch filter (step 128). When the first and second portions of the frequency characteristic of the control loop excluding the notch filter are coupled together, the transfer function T(f) from $f_{min}$ to $f_{max}$ can be provided (step 130).

The processes at steps 128 and 130 may be performed by the drive CPU 13 of the HDD 1, or by the servo processor 9.

The transfer function concerning the actuator and the servo controller excluding the notch filter, is acquired. Since, when the transfer function is derived, the loop gain is not changed and the notch filter is always present, the control loop of the positioning apparatus rarely becomes unstable.

Figure 8:
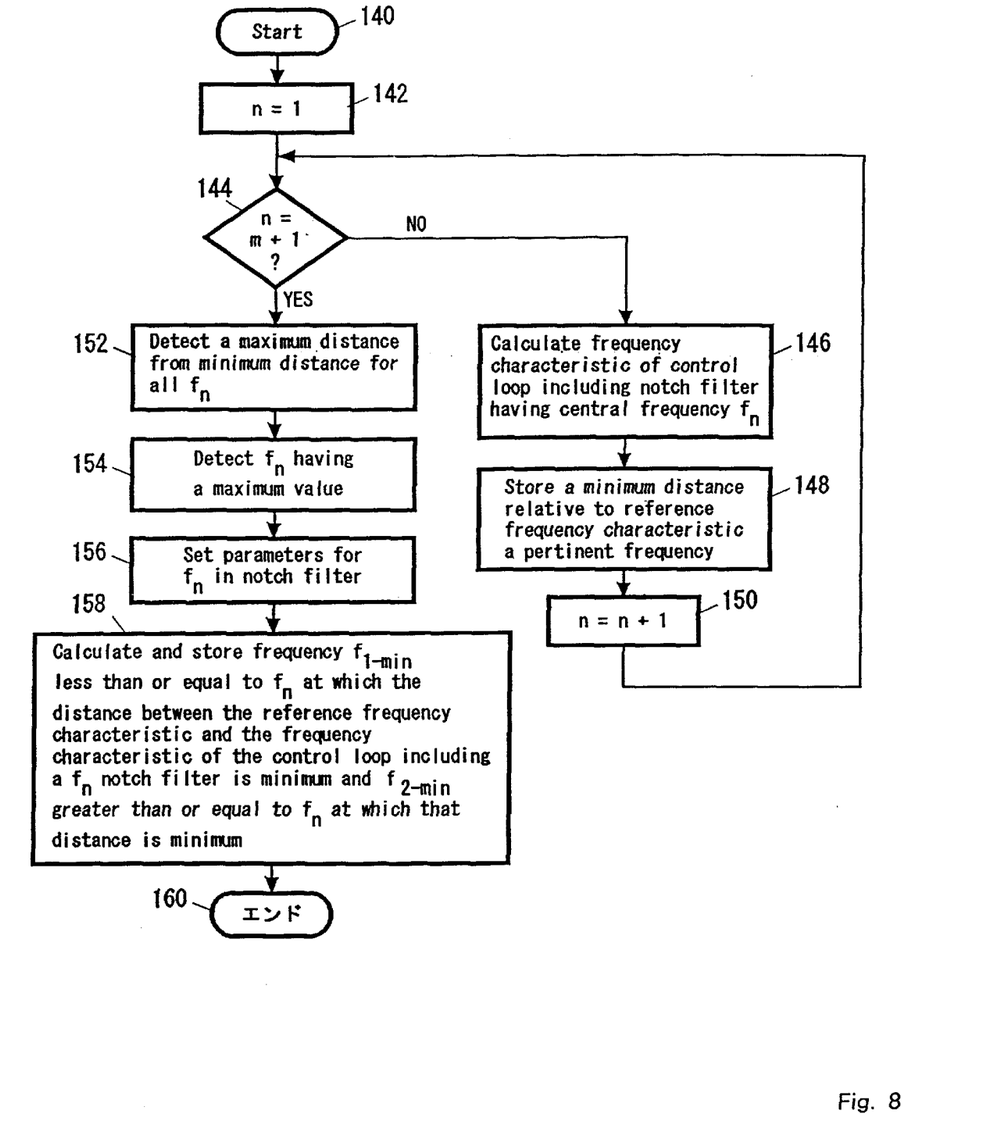
FIG. 8 is a flowchart for setting an optimal notch filter.

The process performed by the tester 3 for setting an optimal notch filter will now be described. First, n is initialized as n =1 (step 142 in FIG. 8). The processes at steps 146 to 150 are repeated until n becomes m (step 144). The meaning of m is that there are m sets of the coefficients for the notch filters having the central frequency $f_n$ that are shifted by $\Delta f$. The coefficients for the notch filters having the central frequency $f_n$ are read from the memory 23, and $G_{fn}(f)$ is calculated using the equation 3. $T_{fn}=T(f)G_{fn}(f)$ is employed to calculate the frequency characteristic of the open loop gain of the control loop, which includes notch filters having the central frequency $f_n$ (step 146). The predetermined reference frequency characteristic $T_{ref}(f)$ is compared with $T_{fn}$ to store the minimum distance in the memory 23 (step 148). The distance is defined as $D_{fn}(f)=T_{fn}/T_{ref}(f)$. The minimum distance is defined as $D_{min}(f_n)$ and is then stored, and n is incremented by 1. Program control thereafter returns to step 144. Thus, $D_{min}(f_n)$ from n=1 to m is acquired. The reference frequency characteristic $T_{ref}(f)$ is such that the gain linearly decreases when the frequency increases, and is used to regulate a desired form of the open loop gain. Such an open loop gain form is represented as, for example, the function of $\log(T_{ref}(f))=c_1\log(f)+c_0$ ($c_0$ or $c_1$ is a constant and $c_1<0$).

Figure 9:
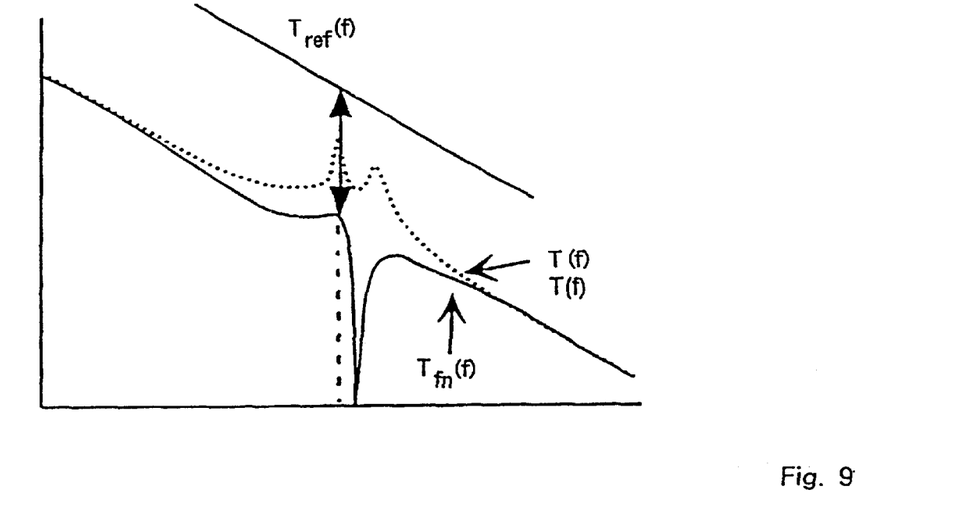
FIG. 9 is a graph showing the relationship between reference frequency characteristic $T_{ref}$ and frequency characteristic $T_{fn}$ of a control loop including a notch filter that has a central frequency of $f_{fn}$.

FIG. 9 shows the relationship between the reference frequency, and $T_{ref}(f)$ and T(f). A line that decreases linearly as the frequency is raised represents $T_{ref}(f)$, and a broken line is used to represent the T(f), which is the open loop gain without a notch filter, while a solid line represents $T_{fn}(f)$, which is an open loop gain with a notch filter. $D_{fn}(f)$ is a distance in this embodiment.

When the calculation of $D_{min}$ is performed for each n, the maximum $D_{min}$ is detected (step 152). This is the best notch filter. Therefore, $f_n$ of the maximum $D_{min}$ is found and is set as the central frequency of the notch filter (step 156). In the setup, the coefficients of the notch filter having the frequency $f_n$ that are stored in the memory 23 are transmitted via the bus interface 19 to the HDD 1. When the coefficient table for the notch filter is stored in the memory 11, only the frequency $f_n$ need be designated. Finally, the coefficients are set in the notch filter in the servo processor 9, and are stored in the memory 11. The setup of the notch filter in the initial state of the HDD 1 is thereafter completed. When the notch filter is to be adjusted during the normal operation of the HDD 1, the following processing is performed.

Figure 10:
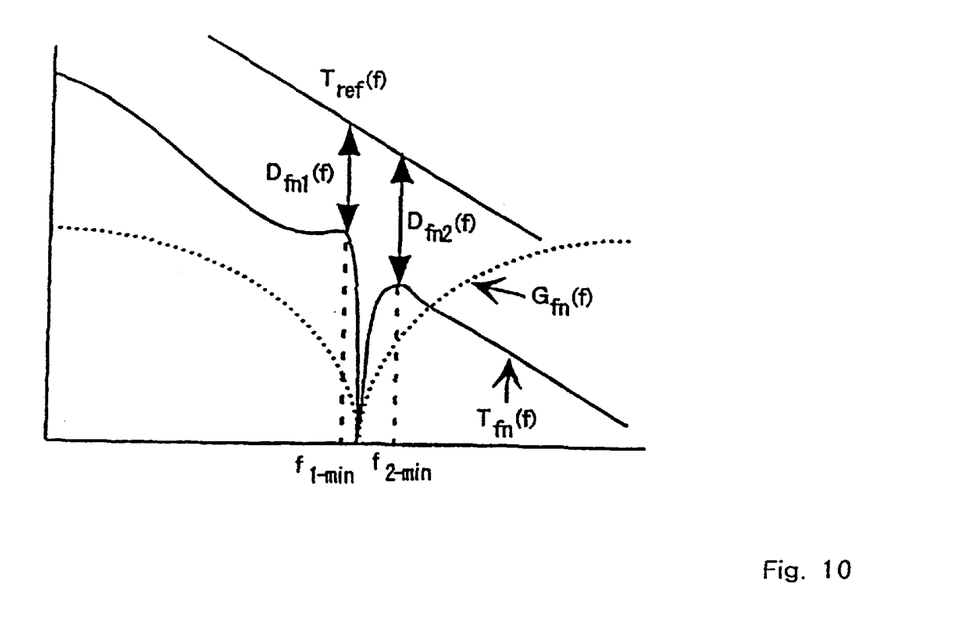
FIG. 10 is a graph for explaining $f_{1-min}$ and $f_{2-min}$.

The frequency $f_{1-min}$ less than or equal to $f_n$, at which the distance between the frequency characteristic $T_{fn}(f)$ of the control loop including a notch filter having the central frequency $f_n$ and the reference frequency characteristic $T_{ref}(f)$ is minimum, and frequency $f_{2-min}$ greater than or equal to $f_n$, at which the distance between the frequency characteristic $T_{fn}(f)$ and the reference frequency characteristic $T_{ref}(f)$ is minimum. This relationship is shown in FIG. 10. Since $T_{fn}(f)$ falls considerably at $f_n$, a frequency closest to the reference frequency $T_{ref}(f)$ is present on either side of $f_n$, regardless of the frequency characteristic T(f) without a notch filter. The frequencies $f_{1-min}$ and $f_{2-min}$ are detected, and are stored in a nonvolatile memory of the HDD 1. These frequencies are used to adjust the notch filter during the normal operation. It should be noted that when performing the adjustment of the notch filter, the notch filter table that is stored in the memory 23 must also be held in the memory 11. Thus, the memory 11 may be a nonvolatile memory for storing those data.

The processing for adjusting the notch filter during the normal operation of the HDD 1 will now be described. The following processing is to be performed only by the HDD 1. A notch filter adjustment command is issued when the HDD 1 does not access data (step 172 in FIG. 11). To input at the reference position of the control loop in FIG. 2, the drive CPU 13 develops $R_{ref}(t)=a_r\sin(2\pi f_{1-min}t)$ in the memory, reads it for each clock and outputs it to the servo processor 9 (step 174). The head position error signal $P_{es1}(t)$, which is detected at the same time, is stored in the memory 15 (step 176). Similarly, the drive CPU 13 develops $R_{ref}(t)=a_r\sin(2\pi f_{2-min}t)$ in the memory, reads it for each clock and outputs it to the servo processor 9 (step 178). The head position error signal $P_{es2}(t)$, which is detected at the same time, is stored in the memory 15 (step 180).

When data having a certain volume is acquired, the open loop transfer function $T_{open}(f_{1-min})$ is calculated by the previously described method using the equation 1 to acquire the distance $D(f_{1-min})$ from the reference frequency characteristic $T_{ref}(f)$. In addition, the open loop transfer function $T_{open}(f_{2-min})$ is calculated, using the equation 1, to acquire the distance $D(f_{2-min})$ from the reference frequency characteristic $T_{ref}(f)$ (steps 182 and 184). Then, it is checked whether $|D(f_{1\text{-}min})-D(f_{2\text{-}min})|<D_{th}$ ($D_{th}$ is a predetermined threshold value) (step 186). If the above expression is established as true, it is assumed that the current notch filter is an almost optimal filter, and the processing is thereafter terminated (step 194). If the above expression is not established as true, it is checked whether $D(f_{1\text{-}min})>D(f_{2\text{-}min})$ (step 188). If it is, it is assumed that the frequency of the mechanical resonance has been lowered, and only the coefficients for the notch filter that has a central frequency lower by Δf are read from the memory 11, and set to the notch filter (step 192). If the above expression is not established as true, it is assumed that the frequency of the mechanical resonance has been lifted, only the coefficients for the notch filter that has a central frequency higher by Δf are read from the memory 11, and are set in the notch filter (step 190).

The notch filter adjustment process is thereafter terminated. In addition to the method which uses a single sine wave signal, there is a method which uses a signal having two frequency elements. For example, a signal $R_{ref}(t)=a_r\sin(2\pi f_{1\text{-}min}t)+a_r\sin(2\pi f_{2\text{-}min}t)$ is input and the following calculations are performed, so that $T_{open}(f_{1\text{-}min})$ and $T_{open}(f_{2\text{-}min})$ can be obtained.

$$T_{open}(f_{1-min}) = \left[1 - \frac{a_r}{\sqrt{\left(\sum P_{es}(t)\sin(2\pi f_{1-min}t)\right)^2 + \left(\sum P_{es}(t)\cos(2\pi f_{1-min}t)\right)^2}}\right]^{-} \quad \text{Equation 4}$$

$$T_{open}(f_{2-min}) = \left[1 + \frac{a_r}{\sqrt{\left(\sum P_{es}(t)\sin(2\pi f_{2-min}t)\right)^2 + \left(\sum P_{es}(t)\cos(2\pi f_{2-min}t)\right)^2}}\right]^{-} \quad \text{Equation 5}$$

$$T_{open}(f_{1-min}) = \sqrt{\frac{\left(\sum P_{es}(t)\sin(2\pi f_{1-min}t)\right)^2 + \left(\sum P_{es}(t)\cos(2\pi f_{1-min}t)\right)^2}{\left(\sum U(t)\sin(2\pi f_{1-min}t)\right)^2 + \left(\sum U(t)\cos(2\pi f_{1-min}t)\right)^2}} \quad \text{Equation 6}$$

$$T_{open}(f_{2-min}) = \sqrt{\frac{\left(\sum P_{es}(t)\sin(2\pi f_{2-min}t)\right)^2 + \left(\sum P_{es}(t)\cos(2\pi f_{2-min}t)\right)^2}{\left(\sum U(t)\sin(2\pi f_{2-min}t)\right)^2 + \left(\sum U(t)\cos(2\pi f_{2-min}t)\right)^2}} \quad \text{Equation 7}$$

As a result, the optimal notch filter can always be set even when the resonant frequency of the actuator is shifted due to the temperature change. Since in the calculation process merely the transfer functions at the two frequencies are compared, very few calculations are required, the circuits in the HDD and the programs are not complicated, and only a short time is required to perform the calculations whereby the normal operation of the HDD is not interrupted. order of the above described processes can be changed so long as the final result is the same. In FIG. 5 the processing for $f_{01}$ is performed first, but the processing for $f_{02}$ may be performed first. Further, in FIG. 5, a position error signal is transmitted, therefore, immediately after the value of the position error signal for $f_{01}$ is stored, the value of the position error signal for $f_{02}$ is stored. However, the calculation until obtaining the frequency characteristic of the control loop, which includes the notch filter having the central frequency $f_{01}$, may be performed first, and the processing for $f_{02}$ may be performed later. Or else, the calculation until obtaining the frequency characteristic of the control loop, which excludes the notch filter, may be performed first, and the processing for $f_{02}$ may be performed later.

Figure 11:
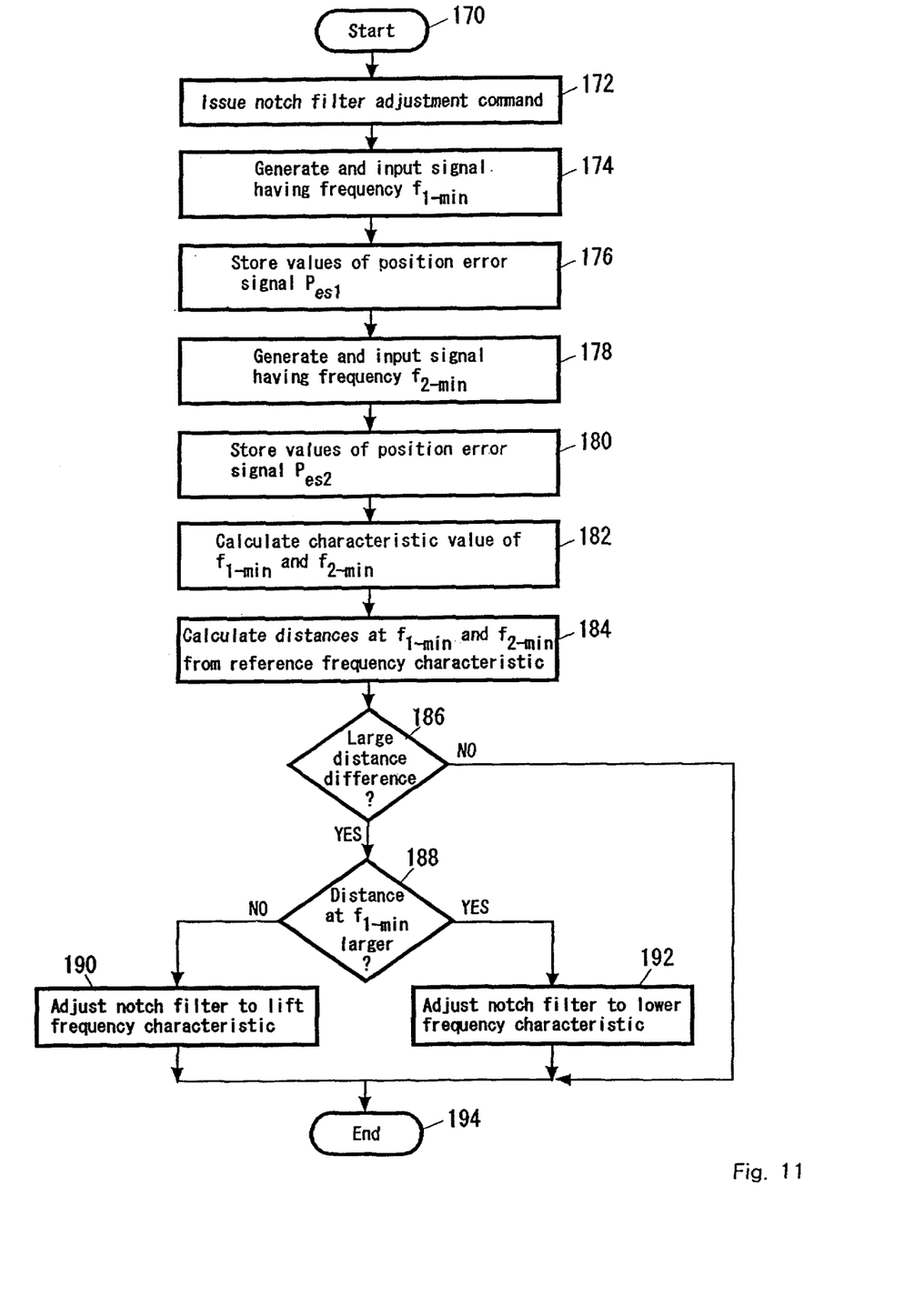
FIG. 11 is a flowchart showing the processing for adjusting a notch filter during the normal operation.

In FIG. 11, the processing for $f_{1\text{-}min}$ is performed first, but the processing for $f_{2\text{-}min}$ may be performed first. In addition, the values of the position error signals for $f_{1\text{-}min}$ and $f_{2\text{-}min}$ are stored; however, the processing until step 182 or 184 may be performed for $f_{1\text{-}min}$ first and the processing until step 182 or 184 may be then performed for $f_{2\text{-}min}$.

The functional block in FIG. 1 is merely an example, and the arrangement may differ depending on the type of positioning apparatus. Also, the number and positions of the CPUs and the memory configuration may also vary. In many cases, a function for adjusting the positioning apparatus is included in the positioning apparatus, and the positioning apparatus can itself perform all the setup and the adjustment processing.

Even when an apparatus that employs an actuator for positioning an object to be controlled has mechanical resonance at a plurality of frequencies, stable feedback control can be provided by selecting an optimal notch filter.

The frequency characteristic of a control loop excluding a notch filter can be derived by employing a method that does not damage a positioning apparatus.

A notch filter can be adjusted in accordance with a change in a resonant frequency of an actuator due to a temperature dependency, and a control loop can be constituted with no deterioration of a control performance.

It is possible to provide a method for which only a short time is required for the adjustment of a notch filter, which is performed during the normal operation of a positioning apparatus, and to thus seldom interrupt the normal operation of the apparatus.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

What is claimed is:

1. A method for deriving the frequency characteristic of a control loop, comprising the steps of:

deriving the frequency characteristic of the control loop including a first notch filter between a maximum frequency $f_{max}$ of said frequency characteristic to be derived and a frequency $f_3$ ($f_{max}>f_3$), said first notch filter having a central frequency of $f_1$ that falls between a minimum frequency $f_{min}$ of said frequency characteristic to be derived and said frequency $f_3$ ($f_{min}<f_3$); by using the frequency characteristic of said first notch filter, calculating a first portion of said frequency characteristic of the control loop excluding said first notch filter from said frequency characteristic of said control loop including said first notch filter;

deriving the frequency characteristic of said control loop including a second notch filter between said minimum frequency $f_{min}$ and said frequency $f_3$, said second notch filter having a central frequency of $f_2$ that falls between said maximum frequency $f_{max}$ and said frequency $f_3$;

by using said frequency characteristic of said second notch filter, calculating a second portion of the frequency characteristic of the control loop excluding said second notch filter from said frequency characteristic of said control loop including said second notch filter; and combining said first and second portions of said frequency characteristic.

2. A method for setting a notch filter provided in a control loop, comprising the steps of:

deriving a frequency characteristic of the control loop excluding said notch filter;

calculating a frequency characteristic of the control loop including a first notch filter from said frequency characteristic of said first notch filter and said frequency characteristic of the control loop excluding said notch filter, said first notch filter having a specific frequency as a central frequency, and detecting a minimum distance between a predetermined reference frequency characteristic and said frequency characteristic of the control loop including said first notch filter;

performing said calculating step while changing said central frequency of said first notch filter in a required frequency bandwidth; and finding out a maximum value from among detected minimum distances, and setting, to said notch filter, said central frequency of said first notch filter which causes said maximum value.

3. The method according to claim 2, wherein said deriving step comprises the steps of:

deriving the frequency characteristic of the control loop including a second notch filter between a maximum frequency $f_{max}$ of said frequency characteristic to be derived and a frequency $f_3$ ($f_{max} > f_3$), said second notch filter having a central frequency of $f_1$ that falls between a minimum frequency $f_{min}$ of said frequency characteristic to be derived and said frequency $f_3$ ($f_{min} < f_3$);

by using the frequency characteristic of said second notch filter, calculating a first portion of said frequency characteristic of the control loop excluding said second notch filter from said frequency characteristic of the control loop including said second notch filter;

deriving the frequency characteristic of the control loop including a third notch filter between said minimum frequency $f_{min}$ and said frequency $f_3$, said third notch filter having a central frequency of $f_2$ that falls between said maximum frequency $f_{max}$ and said frequency $f_3$;

by using said frequency characteristic of said third notch filter, calculating a second portion of the frequency characteristic of the control loop excluding said third notch filter from said frequency characteristic of said control loop including said third notch filter; and combining said first and second portions of said frequency characteristic.

4. The method according to claim 2, further comprising the step of, for a notch filter whose central frequency is set, calculating a frequency at which a distance between said predetermined reference frequency characteristic and said frequency characteristic of said control loop including said notch filter, is the minimum.

5. A method for adjusting a setup of a notch filter to stably operate a control loop including said notch filter, comprising the steps of:

deriving, at a first frequency, a first distance between a current frequency characteristic of said control loop and a predetermined reference frequency characteristic, wherein said first frequency is higher than a central frequency of said notch filter, and a distance between the frequency characteristic of said control loop and said predetermined reference frequency characteristic was the minimum at said first frequency;

deriving, at a second frequency, a second distance between said current frequency characteristic of said control loop and said predetermined reference frequency characteristic, wherein said second frequency is lower than said central frequency of said notch filter, and a distance between the frequency characteristic of said control loop and said predetermined reference frequency characteristic was the minimum at the second frequency; and by using said first and second distances, determining whether said central frequency of said notch filter should be shifted.

6. The method according to claim 5, wherein said determining step includes the steps of:

calculating a difference between said first and second distances; and determining whether said difference exceeds a predetermined threshold value.

7. The method according to claim 5, further comprising the steps of:

determining which of said first distance and said second distance is greater if said central frequency of said notch filter is shifted;

adjusting said notch filter by lowering said central frequency if said first distance is greater; and adjusting said notch filter by raising said central frequency if said second distance is greater.

8. An apparatus for deriving the frequency characteristic of a control loop in a controller, comprising:

a module for receiving, from said controller, a first signal in the control loop including a first notch filter at a frequency between a maximum frequency $f_{max}$ of a frequency characteristic to be derived and a frequency $f_3$ ($f_{max} > f_3$), said first notch filter having a central frequency $f_1$ between a minimum frequency $f_{min}$ of the frequency characteristic to be derived and said frequency $f_3$ ($f_{min} < f_3$), and for receiving, from said controller, a second signal in the control loop including a second notch filter at a frequency between said minimum frequency $f_{min}$ and said frequency $f_3$, said second notch filter having a control frequency $f_2$ between said maximum frequency $f_{max}$ and said frequency $f_3$;

a module for calculating the frequency characteristic of the control loop including said first notch filter by using said first signal, and for calculating the frequency characteristic of the control loop including said second notch filter by using said second signal; and a module for calculating a first portion of the frequency characteristic of the control loop excluding said first notch filter from said frequency characteristic of the control loop including said first notch filter by using the frequency characteristic of said first notch filter, and for calculating a second portion of said frequency characteristic of the control loop excluding said second notch filter from said frequency characteristic of the control loop including said second notch filter by using the frequency characteristic of said second notch filter, and for combining said first and second portions of said frequency characteristic.

9. A controller comprising:

a notch filter that has a central frequency $f_1$ between a minimum frequency $f_{min}$ of a frequency characteristic to be derived and a frequency $f_3$ ($f_{min} < f_3$); and a module for inputting, into a control loop including said notch filter, a first signal having a frequency between a maximum frequency $f_{max}$ of said frequency characteristic to be derived and said frequency $f_3$ ($f_{max} > f_3$), and for storing a value of a second signal corresponding to said first signal, in the control loop, wherein, if a frequency $f_2$ between said maximum frequency $f_{max}$ and said frequency $f_3$ is set as a central frequency of said notch filter, said module inputs, into the control loop including said notch filter in which said frequency $f_2$ is set as a central frequency, a third signal having a frequency between said minimum frequency $f_{min}$ and said frequency $f_3$, and stores a value of a fourth signal corresponding to said third signal, in the control loop.

10. The controller according to claim 9, further comprising:
a module for calculating said frequency characteristic of the control loop including said notch filter having said frequency $f_1$ as a central frequency by using the value of said second signal, and for calculating said frequency characteristic of the control loop including the notch filter having said frequency $f_2$ as a central frequency by using the value of the fourth signal.

11. The controller according to claim 10, further comprising:
a module for employing said frequency characteristic of the notch filter having said frequency $f_1$ as the central frequency to calculate a first portion of said frequency characteristic of the control loop excluding said notch filter from said frequency characteristic of the control loop including said notch filter having said frequency $f_1$ as the central frequency, for employing said frequency characteristic of said notch filter having said frequency $f_2$ as the central frequency to calculate a second portion of said frequency characteristic of the control loop excluding said notch filter from said frequency characteristic of the control loop including said notch filter having said frequency $f_2$ as the central frequency, and for combining said first and second portions of said frequency characteristic.

12. The controller according to claim 11, further comprising:
a detection module for calculating the frequency characteristic of the control loop including a first notch filter from said frequency characteristic of said first notch filter and said frequency characteristic of the control loop excluding said notch filter, said first notch filter having a specific frequency as a central frequency, and for detecting a minimum distance between a predetermined reference frequency characteristic and said frequency characteristic of the control loop including said first notch filter.

13. The controller according to claim 12, further comprising:
a module for acquiring a maximum value from among a plurality of detected minimum distances, and for setting, to said notch filter, said central frequency of said first notch filter which causes said maximum value.

14. The controller according to claim 13, further comprising:
a module for calculating, for a notch filter a central frequency of which is set, a frequency at which a distance between said predetermined reference frequency characteristic and said frequency characteristic of the control loop including said notch filter, is the minimum.

15. An apparatus for setting a notch filter of a positioning apparatus having said notch filter, comprising:
a module for deriving a frequency characteristic of a control loop of said positioning apparatus, excluding said notch filter;
a detection module for calculating the frequency characteristic of the control loop including a first notch filter from said frequency characteristic of said first notch filter and said frequency characteristic of the control loop excluding said notch filter, said first notch filter having a specific frequency as a central frequency, and for detecting a minimum distance between a predetermined reference frequency characteristic and said frequency characteristic of said control loop including said first notch filter; and
a module for instructing said positioning apparatus to find out a maximum value from among a plurality of detected minimum distances, and to set, to said notch filter, said central frequency of said first notch filter which causes said maximum value.

16. The apparatus according to claim 15, further comprising:
a module for calculating, for a notch filter a central frequency of which is set, a frequency at which a distance between said predetermined reference frequency characteristic and said frequency characteristic of the control loop including said notch filter, is the minimum.

17. A controller including a notch filter, comprising:
a module for deriving, at a first frequency, a first distance between a current frequency characteristic of a control loop in said controller and a predetermined reference frequency characteristic, wherein said first frequency is higher than said central frequency of the notch filter, and a distance between said frequency characteristic of said control loop and said predetermined reference frequency characteristic was the minimum at said first frequency, and for deriving, at a second frequency, a second distance between said current frequency characteristic of said control loop and said predetermined reference frequency characteristic, wherein said second frequency is lower than said central frequency of said notch filter, and a distance between said frequency characteristic of said control loop and said predetermined reference frequency characteristic was the minimum at the second frequency; and
a determination module for employing said first and second distances to determine whether said central frequency of said notch filter should be shifted.

18. The controller according to claim 17, wherein said determination module calculates a difference between said first and second distances, and determines whether said difference exceeds a predetermined threshold value.

19. The controller according to claim 17, further comprising a module for determining which of said first distance and said second distance is greater if said central frequency of said notch filter is to be shifted, for issuing an instruction to lower said central frequency if said first distance is greater; and
for issuing an instruction to raise said central frequency if said second distance is greater.

20. A disk storage device comprising:
a notch filter that has a central frequency $f_1$ between a minimum frequency $f_{min}$ of a frequency characteristic to be derived and a frequency $f_3$ ($f_{min} < f_3$);
a first module for inputting, into a control loop including said notch filter, a first signal having a frequency between a maximum frequency $f_{max}$ of said frequency characteristic to be derived and said frequency $f_3$ ($f_{max}>f_3$), and for storing a value of a second signal corresponding to said first signal, in said control loop; and a control module for setting a frequency $f_2$ between said maximum frequency $f_{max}$ and said frequency $f_3$ as a central frequency to said notch filter, for causing said first module to input, into the control loop including the notch filter having said central frequency $f_2$, a third signal having a frequency between said minimum frequency $f_{min}$ and said frequency $f_3$, and for storing a value of a fourth signal corresponding to said third signal, in said control loop.

21. A disk storage device comprising:

a head controller having a notch filter, said head controller including:

a module for deriving, at a first frequency, a first distance between a current frequency characteristic of a control loop in said head controller and a predetermined reference frequency characteristic, wherein said first frequency is higher than said central frequency of said notch filter, and a distance between said frequency characteristic of said control loop and said predetermined reference frequency characteristic was the minimum at said first frequency, and for deriving, at a second frequency, a second distance between said current frequency characteristic of said control loop and said predetermined reference frequency characteristic, wherein said second frequency is lower than said central frequency of said notch filter, and a distance between said frequency characteristic of said control loop and said predetermined reference frequency characteristic was the minimum at the second frequency; and a determination module for employing said first and second distances to determine whether said central frequency of said notch filter should be shifted.

* * * * *